UNITED STATES PATENT OFFICE.

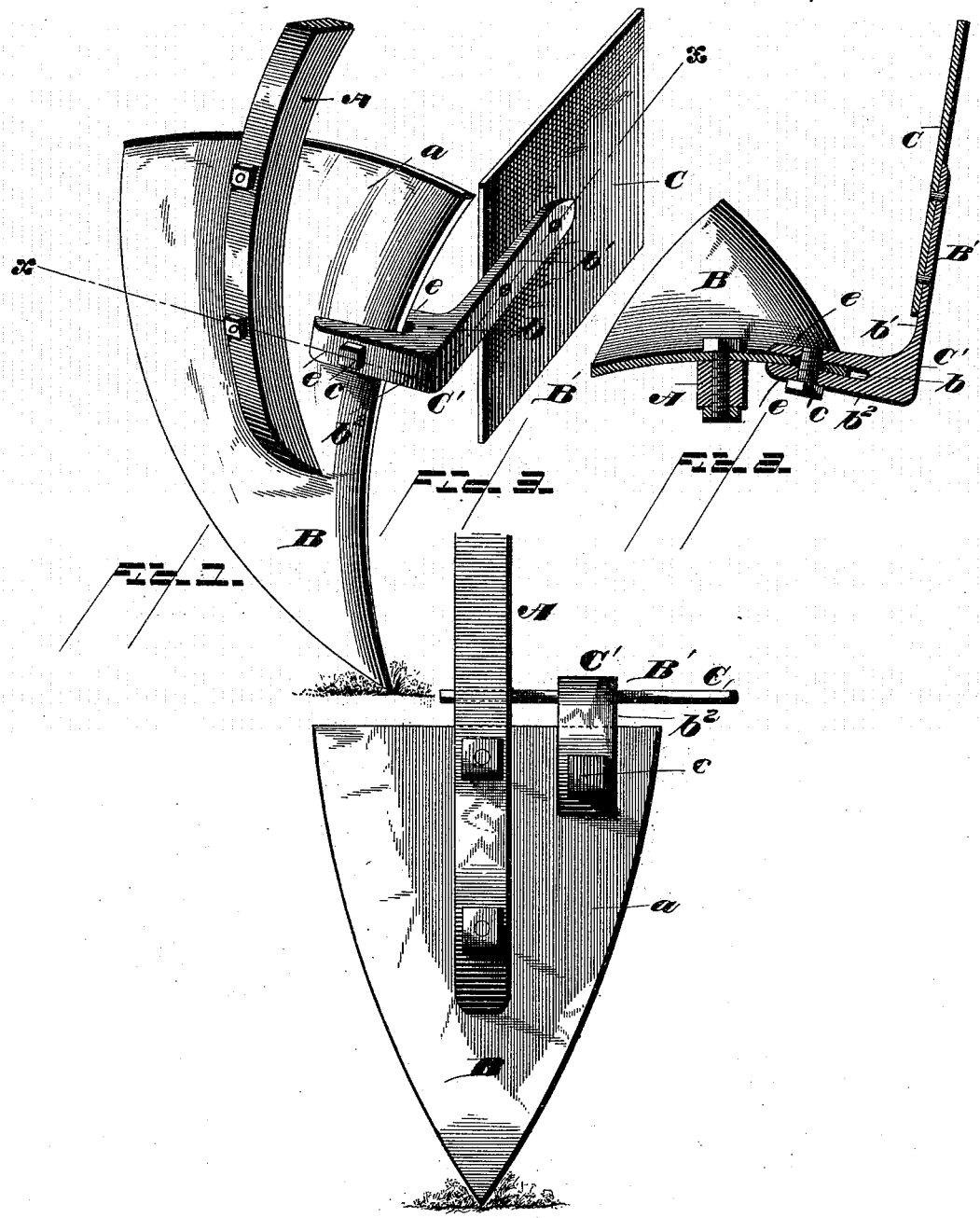

HUGH S. NULL AND JONAS BUSSARD, OF HUNTINGTON, INDIANA.

PLOW ATTACHMENT.

SPECIFICATION forming part of Letters Patent No. 376,393, dated January 10, 1888.

Application filed July 14, 1887. Serial No. 244,328. (No model.)

*To all whom it may concern:*

Be it known that we, HUGH S. NULL and JONAS BUSSARD, citizens of the United States, residing at Huntington, in the county of Huntington and State of Indiana, have invented certain new and useful Improvements in Plow Attachments; and we do declare the following to be a full, clear, and exact description of the invention, such as will enable others skilled in the art to which it appertains to make and use the same.

Our invention has relation to improvements in fenders or cutter attachments for plows; and the novelty consists in the peculiar construction and arrangement of parts, as will be hereinafter fully described, and particularly pointed out in the claims.

In the accompanying drawings, which form a part of this specification, Figure 1 is a perspective view of a plowshare or shovel, showing my improved device in position thereon. Fig. 2 is a horizontal sectional view taken on the line $x\ x$ of Fig. 1; and Fig. 3 is a rear elevation of the same with the fender or cutter shown shifted to a position on the top of the plowshare or shovel, and at right angles to that shown in Fig. 1.

Referring by letter to the drawings, A indicates the plow-standard, to which is secured the plowshare or shovel B, in any suitable manner.

The standard and plowshare are both constructed in the usual well-known form, and the latter is provided with one or more transverse apertures. These apertures may be along the longitudinal edges of the blade, and also adjacent to the top or transverse edge for the attachment of the fender in various positions, as will be presently explained.

B' designates our improved fender or cutter attachment, which comprises the cutter or fender blade C, the casting C', and the set-screw $c$, whereby, through the medium of the latter, the casting carrying the fender-blade may be detachably held and supported upon the shovel or plowshare B.

It will be observed that the casting is formed with two arms, $b'\ b^2$, at right angles to each other, the arm $b'$ being flat and of a greater length than the arm $b^2$, and provided with apertures for the purpose of attaching the fender-blade or cutter to the said arm. The arm $b^2$ of the casting is bifurcated at its free end, as at $b$, to provide arms $e\ e$, which embrace the edge of the plowshare or shovel, and is held firmly thereon by the set-screw $c$, working through the openings formed in the arms $e\ e$, and the aperture $a$, made in the plowshare, as clearly shown in the drawings.

It will be understood that the cutter or fender may be placed at any point on the plowshare, either at the top or side edges of the same.

This being the construction of our invention the operation is as follows: When it is necessary to plow close to a row of corn, for instance, the fender or cutter is attached to the shovel of the plow at the desired point, whereby when the plow is moved forward the plowed or loose particles of dirt that would naturally fall against the stalks of corn and seriously injure the same are caught by the fender, thus defending the corn from damage. When, again, it is necessary to plow beneath the overhanging sprays or branches of the corn, the fender is detached from the edge of the shovel or plowshare and changed to the top horizontal plane of the same by providing a supplemental aperture, $a'$, in the share at that point, as will also be very readily understood.

Slight changes can be made as to the form and proportion of the various parts of our invention without departing from the spirit or gist thereof.

Having thus described our invention, what we claim as new and useful is—

1. In a fender attachment, the combination of the casting C', having the arms $b'\ b^2$, the arm $b^2$ being bifurcated and secured to the plowshare, while the arm $b'$ is adapted to support and carry the fender-blade, the said blade adapted to be removably secured thereto, substantially as and for the purpose set forth.

2. In a fender attachment, the combination of the casting having one of its arms bifurcated and the other adapted to carry the fender-blade, the plowshare provided with apertures, whereby the casting carrying the fender may be detached and secured to the same through the medium of a set-screw working through apertures formed in the bifurcated ends of the casting, and the shovel or plowshare, substantially as and for the purpose set forth.

In testimony whereof we affix our signatures in presence of two witnesses.

HUGH S. NULL.
JONAS BUSSARD.

Witnesses:
G. W. STUTT,
MICHAEL SCHEELY.